(12) United States Patent
Vang et al.

(10) Patent No.: US 6,780,366 B2
(45) Date of Patent: Aug. 24, 2004

(54) DRIP RETAINER

(75) Inventors: Koua Vang, Oakdale, MN (US); Phillip E. Duckert, Minneapolis, MN (US); Terence M. Fogarty, Hudson, WI (US)

(73) Assignee: Mentor Corporation, Santa Barbara, CA (US)

( * ) Notice: Subject to any disclaimer, the term of this patent is extended or adjusted under 35 U.S.C. 154(b) by 0 days.

(21) Appl. No.: 10/219,949

(22) Filed: Aug. 15, 2002

(65) Prior Publication Data

US 2004/0032056 A1 Feb. 19, 2004

(51) Int. Cl.[7] ............................................. B29C 41/14
(52) U.S. Cl. ................... 264/301; 220/475; 220/571; 118/501; 425/215; 425/270
(58) Field of Search ................... 425/215, 269, 425/270, 272, 275; 118/423, 501; 141/333, 334, 332, 364; 220/553, 554, 475, 571; 215/392, 394; 264/301, 305; B29C 41/14

(56) References Cited

U.S. PATENT DOCUMENTS

| | | | | |
|---|---|---|---|---|
| 503,708 A | * | 8/1893 | Ross ........................... 220/475 |
| 1,092,761 A | * | 4/1914 | Tyler ........................... 118/501 |
| 1,359,056 A | * | 11/1920 | Gregory ...................... 215/394 |
| 1,487,065 A | * | 3/1924 | Irons ........................... 220/571 |
| 1,951,402 A | * | 3/1934 | Gammeter ................... 425/275 |
| 2,100,576 A | * | 11/1937 | Spanel ......................... 425/275 |
| 2,146,293 A | * | 2/1939 | Gammeter ................... 425/272 |
| 2,316,630 A | * | 4/1943 | Schuster ...................... 118/501 |
| 2,544,578 A | * | 3/1951 | Winkler ....................... 220/475 |
| 2,605,505 A | * | 8/1952 | Ruhland ...................... 425/270 |
| 2,649,735 A | * | 8/1953 | Feild ........................... 264/301 |
| 2,694,830 A | * | 11/1954 | Pollock ....................... 425/270 |
| 4,472,226 A | * | 9/1984 | Redinger et al. ............ 264/305 |
| 4,481,963 A | * | 11/1984 | Verhoeven et al. ....... 134/104.1 |
| 5,515,998 A | | 5/1996 | Wang .......................... 220/710 |
| 5,979,516 A | | 11/1999 | Grant | |
| 6,260,590 B1 | | 7/2001 | Ziegmann | |
| 6,571,979 B2 | * | 6/2003 | Schmarr ...................... 220/571 |

\* cited by examiner

*Primary Examiner*—Robert B. Davis
(74) *Attorney, Agent, or Firm*—Fish & Richardson P.C., P.A.

(57) ABSTRACT

The invention provides mandrels for producing elastomeric components such as mammary implants. Specifically, the invention provides mandrels that include a mold, a shaft attached to the mold, and a drip retainer attached to the shaft. The drip retainers disclosed herein are configured to catch and contain fluids (e.g., elastomeric compounds dispersed in solvents) that run and/or drip off the mold and shaft, and to retain such fluids when the dipping mandrel is inverted. The invention also provides drip retainers that can catch and contain fluids (e.g., elastomeric compounds dispersed in solvents) when attached to a dipping mandrel, and can retain the fluids upon inversion of the dipping mandrel.

61 Claims, 20 Drawing Sheets

DRIP RETAINER

TECHNICAL FIELD

This invention relates to methods and materials for containing and retaining fluid drips and runoff from a dipping mandrel.

BACKGROUND

Processes for manufacturing dipped elastomeric components often are carried out by hand. A mandrel having a mold in the desired form connected to a shaft is repeatedly dipped in or coated with an elastomeric compound dispersed in a solvent. Between coatings, the dipping mandrel can be inverted and then held upright to allow the fluid to cover the anterior and posterior surfaces of the mold evenly. The mandrel typically is heated between coatings to allow the solvent to evaporate, and also can be heated at the end of the procedure to allow the elastomeric compound to set or cure.

SUMMARY

The invention provides methods and materials for producing dipped elastomeric components such as mammary implants. Specifically, the invention provides dipping mandrels that contain a mold, a shaft, and drip retainer. In general, the mold and drip retainer are attached to the shaft such that fluid (e.g., an elastomeric compound dispersed in a solvent) traveling away from the mold and toward the drip retainer is captured by the drip retainer. Thus, the drip retainers provided herein can be configured to catch and retain fluids that run or drip off the mold and shaft. In addition, the drip retainers provided herein can be designed to retain captured fluids when the dipping mandrel is inverted.

The invention also provides drip retainers that can catch and contain fluids when attached to a shaft of a dipping mandrel. Such drip retainers can retain the captured fluids when the dipping mandrel is inverted. A dipping mandrel containing a drip retainer provided herein can be repeatedly coated with an elastomeric compound dispersed in a solvent, inverted, and righted, such that the collected fluid runoff is substantially retained in the drip retainer. This prevents return of the fluid to the mold or the shaft. This also prevents the contamination of other equipment used in the coating process by fluid runoff.

The dipping mandrels and drip retainers described herein can be used for automated processes, since fluid runoff is completely or substantially prevented from (1) returning to the mold between coatings and (2) contaminating the equipment and work areas. In addition, a dipping mandrel containing a drip retainer provided herein is well-suited to an automated manufacturing process, since the operator need not constantly monitor the process to ensure that fluid does not drip or flow from the drip retainer back to the mold or onto other equipment used in the coating process.

The invention is based on the discovery that a drip retainer can be configured to resemble a hollow funnel having one or more openings in its top surface and can, when attached to the shaft of a dipping mandrel, be used to catch and retain fluids that drip off the mold and/or flow down the shaft. The invention also is based on the discovery that when a drip retainer of the invention is attached to a dipping mandrel that is repeatedly coated with a fluid, such as an elastomeric compound dispersed in a solvent, and transferred from an upright position to a tilted (e.g. sideways or inverted) position, the fluid can be completely or substantially retained within the drip retainer.

In one aspect, the invention features a dipping device. The dipping device can contain: (a) a shaft having a first end and a second end; (b) a mold having a top surface and a bottom surface; and (c) a drip retainer. The bottom surface can define an attachment point and the mold can be attached to the first end at the attachment point. The top surface can define a top reference point opposite the attachment point. The drip retainer can be attached to the shaft between the first end and the second end, and can collect fluid that moves in a direction away from the mold and toward the drip retainer when the dipping device is in an upright position such that the top reference point is centered above the attachment point. The drip retainer can prevent substantially all of the collected fluid from contacting the mold when the dipping device is inverted from the upright position. The shaft can extend in a single direction from the first end to the second end. The shaft can contain steel, aluminum, plastic, metal, or wood. The mold can be a mammary prosthesis mold (e.g., a high profile mammary prosthesis mold, a medium profile mammary prosthesis mold, or a low profile mammary prosthesis mold). The mammary prosthesis can be a 900 cc mammary prosthesis or a 225 to 300 cc mammary prosthesis. The mold can be reversibly attached to the first end (e.g., by a threaded joint, a slip fit, a twist lock, a deformable elastomeric grip, or a magnetic lock). The mold can contain steel, aluminum, porcelain, plastic, an elastomer, wax, glass, or a cellulose-based material.

The drip retainer can have a shell defining an inner space. The shell can have an upper adapter defining an upper aperture, wherein the upper aperture is configured to receive the shaft. The upper adapter can form a fluid tight seal with the shaft. The shell can have a lower adapter defining a lower aperture, wherein the lower aperture is configured to receive the shaft. The lower adapter can form a fluid tight seal with the shaft. The lower adapter can form a taper lock with the shaft. The lower adapter can form a friction fit with the shaft when the shaft enters the lower aperture in a direction toward the upper aperture. The lower adapter can be positioned on the shaft by an o-ring. The upper and lower apertures can be aligned such that the shaft extends through the drip retainer. The upper and lower apertures can be aligned vertically. The shell can have a top surface defining an outer perimeter and an inner perimeter, wherein the top surface slopes downward from the outer perimeter toward the inner perimeter. The top surface can define at least one opening. The at least one opening can be adjacent to an upper adapter (e.g., within 3 centimeters of the upper adapter). The at least one opening can be positioned at a point along the inner perimeter. The inner perimeter can slope toward at least one point along the inner perimeter, and the at least one opening can be positioned at the at least one point. The drip retainer can have an inlet structure that protrudes from the underside of the top surface into the inner space. The shell can have a bottom surface defining an outer perimeter and an inner perimeter, wherein the bottom surface slopes downward from the outer perimeter toward the inner perimeter. The drip retainer can be positioned on the shaft between about 1 centimeter and about 10 centimeters from the mold. The drip retainer can be detachable from the shaft. The drip retainer can contain an absorbent or adsorbent material, a thermoplastic material, or metal. The thermoplastic material can be a polyolefin (e.g., polyethylene, polypropylene, or polymethylpentene). The metal can be aluminum, copper, or steel. The fluid can contain an elastomeric compound (e.g., silicone or polyurethane) dispersed in a solvent.

In another aspect, the invention features a dipping device containing: (a) a shaft having a first end and a second end; (b) a mold having a top surface and a bottom surface; and (c) a drip retainer. The bottom surface can define an attachment point, and the mold can be attached to the first end at the attachment point. The top surface can define a top reference point opposite the attachment point, and the drip retainer can be attached to the shaft between the first end and the second end. The drip retainer can collect fluid that moves in a direction away from the mold and toward the drip retainer when the dipping device is in an upright position such that the top reference point is centered above the attachment point, and can prevent substantially all of the collected fluid from contacting the mold when the dipping device is rotated 90 degrees from the upright position.

In another aspect, the invention features a drip retainer having a shell defining an inner space, wherein the shell contains: (a) an upper adapter defining an upper aperture, wherein the upper aperture is configured to receive a shaft; (b) a lower adapter defining a lower aperture, wherein the lower aperture is configured to receive the shaft; and (c) a top surface defining an outer perimeter, an inner perimeter, and at least one opening, wherein the top surface slopes downward from the outer perimeter toward the inner perimeter, and wherein the at least one opening is positioned at a point along the inner perimeter. The maximum distance across the upper aperture can be between about 2 millimeters and about 5 centimeters. The maximum distance across the lower aperture can be between about 2 millimeters and about 5 centimeters. The upper adapter can form a fluid tight seal with the shaft. The lower adapter can form a fluid tight seal with the shaft. The lower adapter can form a friction fit with the shaft when the shaft enters the lower aperture in a direction toward the upper aperture. The lower adapter can be positioned on the shaft by an oaring. The upper and lower apertures can be aligned such that the shaft extends through the drip retainer. The upper and lower apertures can be aligned vertically. The at least one opening can be adjacent to the upper adapter (e.g., within about 3 centimeters of the upper adapter). The inner perimeter can slope toward at least one point along the inner perimeter, and the at least one opening can be positioned at the at least one point. The shell can have an inlet structure that protrudes from the underside of the top surface into the inner space. The shell can have a bottom surface defining a second outer perimeter and a second inner perimeter, and the bottom surface can slope downward from the second outer perimeter toward the second inner perimeter. The drip retainer can contain a thermoplastic material or metal. The thermoplastic material can be a polyolefin (e.g., polypropylene, polyethylene, or polymethylpentene). The metal can be aluminum, copper, or steel. The drip retainer. can collect fluid that moves in a direction away from a mold and toward the drip retainer when (a) the drip retainer is attached to the shaft that is attached to a mold thereby forming a dipping device, and (b) the dipping device is in an upright position. The drip retainer can prevent substantially all of the collected fluid from contacting the mold when the dipping device is inverted from the upright position.

The invention also features a hollow funnel defining an inner space. The hollow funnel can contain: (a) an upper adapter defining an upper aperture, wherein the upper aperture is configured to receive a shaft; (b) a lower adapter defining a lower aperture, wherein the lower aperture is configured to receive the shaft; and (c) a top surface defining an outer perimeter, an inner perimeter, and at least one opening, wherein the top surface slopes downward from the outer perimeter toward the inner perimeter, and wherein the at least one opening is positioned at a point along the inner perimeter, wherein substantially all the fluid that enters the inner space through the at least one opening when the hollow funnel is in an upright position with the shaft positioned through the upper and lower apertures remains within the inner space when the hollow funnel is inverted from the upright position.

In yet another aspect, the invention features a method for making an elastomeric structure. The method can involve: (a) providing a dipping device, wherein the dipping device contains (i) a shaft having a first end and a second end, (ii) a mold for the elastomeric structure, wherein the mold has a bottom surface defining an attachment point and the mold is attached to the first end at the attachment point, and (iii) a drip retainer, wherein the drip retainer is attached to the shaft between the first end and the second end; (b) contacting the mold with a fluid containing an elastomeric compound such that the fluid coats at least a portion of the mold and such that at least a portion of the excess fluid collects within the drip retainer; (c) inverting the dipping device, wherein substantially all of the collected fluid remains within the drip retainer; and (d) removing the elastomeric coat from the mold, thereby forming the elastomeric structure. The elastomeric structure can be a mammary prosthesis. Steps (b) and (c) can be automated. Step (b) can be performed such that substantially all of the mold is coated by the fluid.

Unless otherwise defined, all technical and scientific terms used herein have the same meaning as commonly understood by one of ordinary skill in the art to which this invention pertains. Although methods and materials similar or equivalent to those described herein can be used to practice the invention, suitable methods and materials are described below. All publications, patent applications, patents, and other references mentioned herein are incorporated by reference in their entirety. In case of conflict, the present specification, including definitions, will control. In addition, the materials, methods, and examples are illustrative only and not intended to be limiting.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
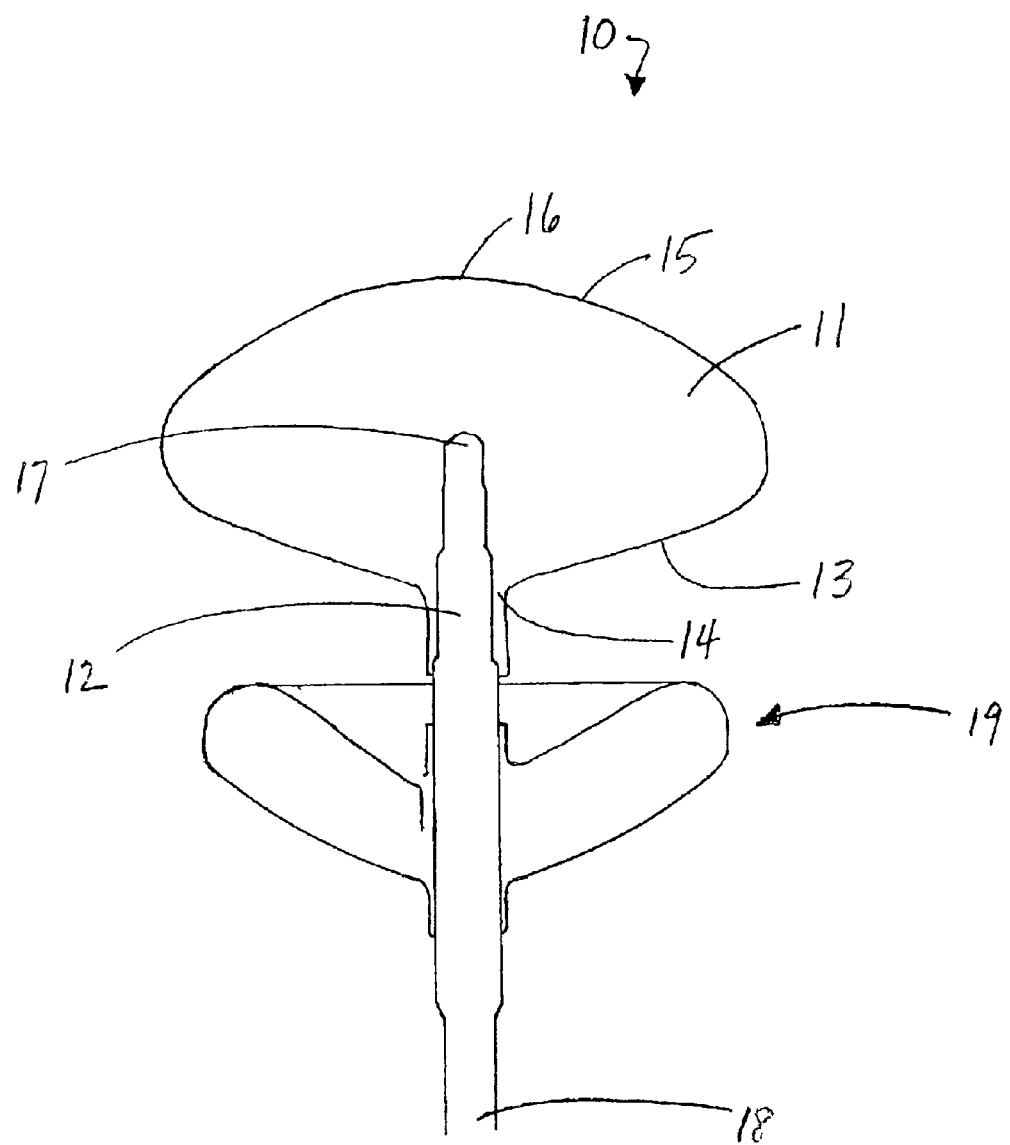
FIG. 1 is a cross-sectional view of a dipping mandrel having a mold, a shaft, and a drip retainer.

The invention provides methods and materials for producing elastomeric components. Specifically, the invention provides drip retainers, dipping mandrels, methods for making drip retainers and dipping mandrels, and methods for making elastomeric components. Drip retainers can be configured to catch and contain fluids when attached to a shaft of a dipping mandrel. Dipping mandrels can contain a mold, a shaft, and a drip retainer. The mold and drip retainer can be attached to the shaft such that fluid (e.g., an elastomeric compound dispersed in a solvent) traveling away from the mold and toward the drip retainer is captured by the drip retainer. The drip retainers provided herein can be designed to retain captured fluids when the dipping mandrel is tilted from an upright position (e.g., tilted 90 degrees or inverted). Such dipping mandrels can be used to make elastomeric components such as mammary implants, tissue expanders, fluid reservoirs, catheter balloons, vaginal stents, testicular implants, condoms, and gloves.

Elastomeric components can contain any suitable material such as polyurethane, Bioflex™, silicone, latex, or other elastomers. Such materials can be formulated in a solvent such as, for example, xylene, heptane, tetrahudrofuraneldioxin, N,N-dimethylformamide, N,N-dimethylacetamide, naptha, or water. In general, elastomeric components can be made by a coating procedure that involves covering a mold with an elastomeric material formulated in a solvent, (2) removing the solvent via evaporation, and (3) curing or heat aging the coated mold to produce the elastomeric component.

In some cases, a dipping mandrel provided herein can be positioned horizontally such that the mold is coated with an elastomeric compound that is dispersed in a solvent. The dipping mandrel then can be rotated and/or placed in an inverted position such that the fluid coats the top surface of the mold. After a suitable length of time (e.g., 10 seconds, 15 seconds, 20 seconds, 25 seconds, 30 seconds, 35 seconds, 40 seconds, 50 seconds, or more than 50 seconds), the dipping mandrel can be placed in an upright position to allow the bottom surface of the mold to be coated. The dipping mandrel typically is heated (e.g., in an oven) set at an appropriate temperature (e.g., 60° C. to 70° C., or 64° C.) for a suitable length of time (e.g., 5 minutes, 7 minutes, 10 minutes, 11 minutes, 11.5 minutes, 12 minutes, 13 minutes, 15 minutes, 25 minutes, 30 minutes, or more than 30 minutes) to allow the solvent to evaporate. The coating process can be repeated until the desired number of coats (e.g., 3, 4, 5, or 6 coats) have been applied. The heating time between each coat can vary, as can the length of time allowed for the fluid to coat the mold evenly. After a suitable number of coats have been applied, the dipping mandrel can be heated (e.g., in an oven) at a suitable temperature (e.g., 120° C., 130° C., or 140° C.) and for a suitable length of time (e.g., 30 minutes) to set the elastomer and fully evaporate the solvent. The dipping procedure can be carried out by hand or can be partially or completely automated.

With reference to FIG. 1, dipping mandrel 10 can have mold 11 and shaft 12. Mold 11 can define bottom surface 13, which can define attachment point 14. Mold 11 also can define top surface 15 opposite bottom surface 13. Top surface 15 can define top reference point 16, which is opposite attachment point 14. Shaft 12 can define first end 17 and second end 18. Mold 11 can be attached to first end 17 of shaft 12 at attachment point 14 by, for example, a threaded joint, a slip fit, or a snap fit (e.g., a deformable elastomeric grip). Mold 11 can be configured to mold any suitable type of device, such as a mammary prosthesis (e.g., a high profile mammary prosthesis, a medium profile mammary prosthesis, a low profile mammary prosthesis, a 900 cc mammary prosthesis, or a 225–300 cc mammary prosthesis), as depicted in FIG. 1. Molds and shafts can be made from any suitable material (e.g., aluminum, steel, wood, plastic, wax, glass, porcelain, or an elastomer such as rubber, silicone, or polyurethane). Shaft 12 can have any shape and length. As depicted in FIG. 1, shaft 12 can be straight (i.e., can extend in a single direction from first end 17 to second end 18). In alternative embodiments, shaft 12 can be offset, bent, or curved. For example, shaft 12 can have a shape defining one or more angles or curves (e.g., resembling the letter "L," the letter "J," or the letter "S," or having a spiral shape).

When dipping mandrel 10 is positioned upright during the dipping process, fluid can drip off mold 11 or flow down shaft 12. As used herein with respect to dipping mandrel 10, the terms "upright" and "in an upright position" refer to positioning of dipping mandrel 10 such that top reference point 16 is centered above attachment point 14. When dipping mandrel 10 is then inverted during, for example, subsequent coating steps, the fluid can flow back toward mold 11 if a drip retainer is not present. As used herein with reference to dipping mandrel 10, the terms "inverted" and "in an inverted position" refer to positioning of dipping mandrel 10 such that top reference point 16 is centered below attachment point 14.

Dipping mandrel 10 contains drip retainer 19. Drip retainer 19 can be positioned on shaft 12 between first end 17 and second end 18, and can be configured to catch and retain fluid that moves (e.g., by dripping or flowing) away from mold 11 and toward drip retainer 19. Such fluid thus is prevented from returning to mold 11 or contaminating other equipment during the coating process. Drip retainer 19 can be movably and releasably positioned on shaft 12 such that in an upright orientation, drip retainer 19 is below mold 11.

Drip retainer 19 can be positioned any suitable distance (e.g., one, two, three, four, five, six, seven, eight, nine, ten, or more than ten centimeters) from mold 11. In some embodiments, drip retainer 19 can be held in position on shaft 12 by an o-ring. An o-ring also can seal the junction between drip retainer 19 and shaft 12, such as when an o-ring is positioned in a groove on shaft 12 and an adapter of drip retainer 19 fits over the o-ring. Alternatively, drip retainer 19 can be adjacent to an o-ring (e.g., within about 1 centimeter of an o-ring) when drip retainer 19 is installed on shaft 12. Drip retainer 19 can be installed on and removed from shaft 12 by, for example, a user (e.g., a human operator) or a machine that exerts force on drip retainer 19 and/or shaft 12. During a dipping procedure, drip retainer 19 can catch fluid runoff from mold 11 and shaft 12, and can retain such fluid during subsequent movement of dipping mandrel 10 to any orientation other than upright (e.g., tilted 5, 10, 20, 30, 45, 55, 65, 75, 85, 90, 95, 100, 110, 120, 130, 140, 150, 160, 170, or 180 degrees from an upright position). At the end of a dipping procedure, drip retainer 19 and any fluid contained therein can be removed from shaft 12 and discarded. Alternatively, drip retainer 19 can be reused after drainage of the fluid.

Drip retainer 19 can be made from any suitable material. For example, drip retainer 19 can be made from a thermoplastic material such as a polyolefin (e.g., polypropylene, polyethylene, or polymethylpentene), or from or a metal (e.g., aluminum, copper, or steel). Drip retainer 19 can be produced using any suitable method (e.g., blow molding or injection molding and welding). Drip retainer 19 can be constructed as a single unit or as two or more pieces (e.g., a top piece and a bottom piece) with the multiple pieces being attached using any suitable method. For example, a top piece and a bottom piece can be attached by spin welding, solvent bonding, ultrasonic welding, hot plate welding or heated die welding, or with metal paste that can be heated to form a bond.

Figure 2:
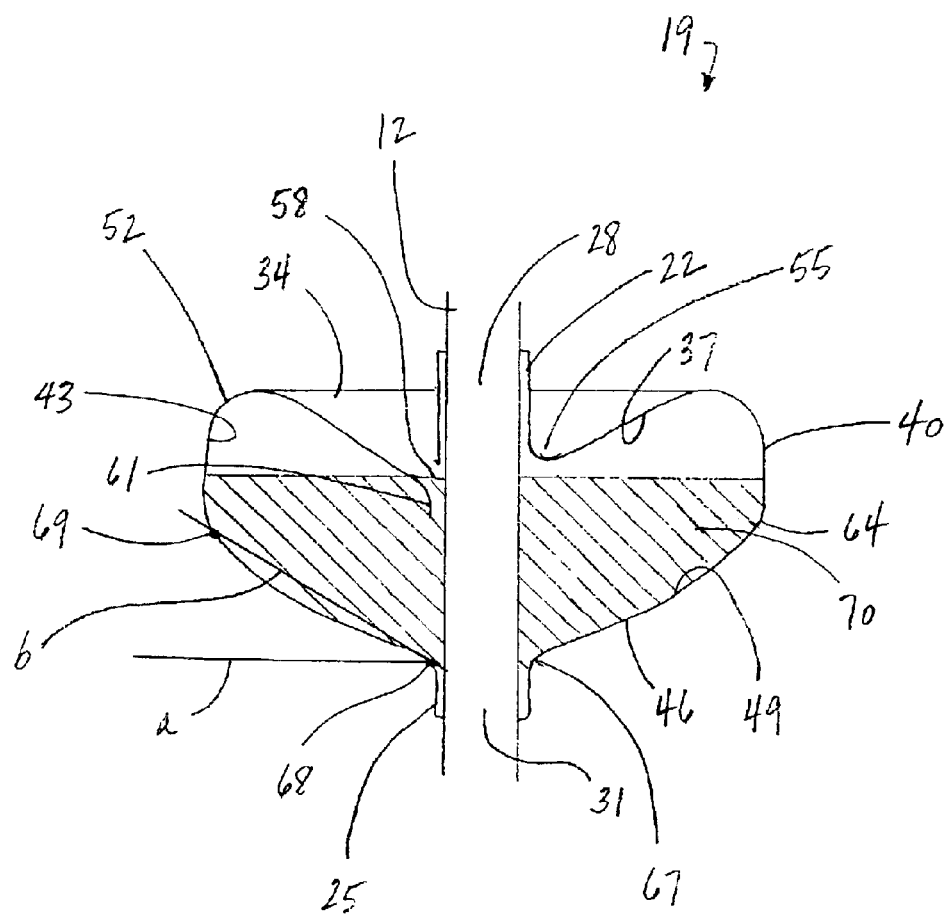
FIG. 2 is a cross-sectional view of the drip retainer of FIG. 1, shown right-side up and containing fluid.
Figure 3:
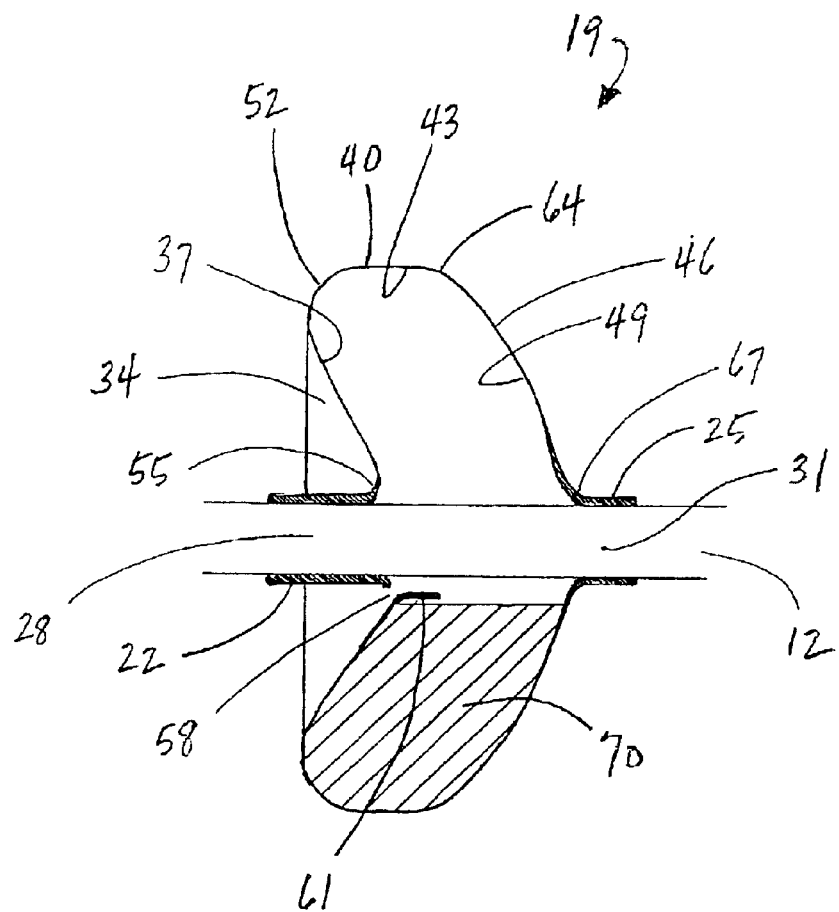
FIG. 3 is a cross-sectional view of the drip retainer of FIG. 1, shown sideways and containing fluid.
Figure 4:
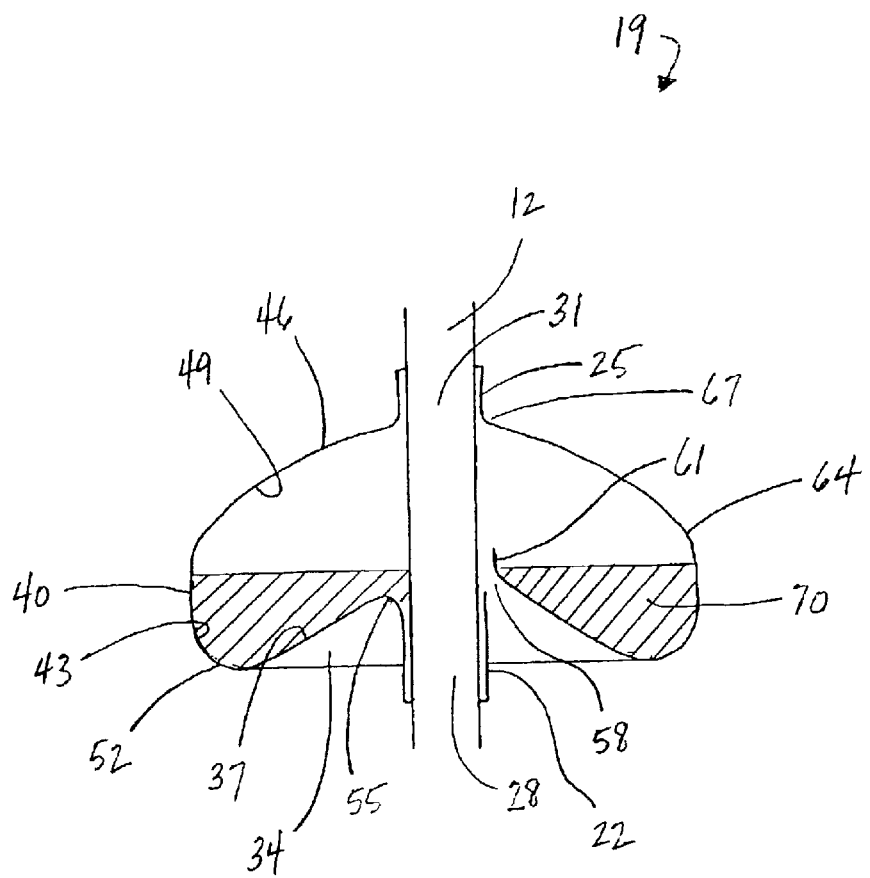
FIG. 4 is a cross-sectional view of the drip retainer of FIG. 1, shown upside-down and containing fluid.

With additional reference to FIGS. 2, 3, and 4, drip retainer 19 can define upper adapter 22 and lower adapter 25, which can define upper aperture 28 and lower aperture 31, respectively. Apertures 28 and 31 can be aligned vertically, for example, and can be configured to permit insertion of shaft 12 so that shaft 12 extends through drip retainer 19. Apertures 28 and 31 can have any suitable diameter (e.g., 1 millimeter, 2 millimeters, 5 millimeters, 1 centimeter, 2 centimeters, 3 centimeters, 4 centimeters, 5 centimeters, or more than 5 centimeters). The diameters of apertures 28 and 31 typically are slightly larger than the diameter of shaft 12 (e.g., 0.01 millimeter to 0.5 millimeter larger).

Adapters 22 and 25 can be configured to attach drip retainer 19 to shaft 12. Adapters 22 and 25 can form, for example, a friction fit, a taper lock, or an interference fit with shaft 12, in order to form a fluid tight seal. Such a fit can be achieved by, for example, configuring adapters 22 and 25 to match the shape of shaft 12. For example, shaft 12 can gradually widen as it progresses from the portion that passes through upper aperture 28 to the portion that passes through lower aperture 31. In such a case, upper aperture 28 defined by upper adapter 22 can have a diameter that is narrower than the diameter of lower aperture 31, which is defined by lower adapter 25. Adapters 22 and 25 typically fit snugly around shaft 12, such that (1) drip retainer 19 does not slide unassisted (i.e., without force being exerted upon it) away from mold 11 when dipping mandrel 10 is upright such that drip retainer 19 is positioned below mold 11 as shown in FIG. 1; (2) fluid contained within drip retainer 19 does not leak out of drip retainer 19 and run down shaft 12 when dipping mandrel 10 is upright such that top reference point 16 is centered above attachment point 14; (3) drip retainer 19 does not slide unassisted (i.e., without force being exerted up on it) toward mold 11 when dipping mandrel 10 is tilted from an upright position (e.g., inverted); and/or (4) fluid contained within drip retainer 19 does not leak out of drip retainer 19 and run along shaft 12 when dipping mandrel 10 is tilted from an upright position (e.g., inverted).

Drip retainer 19 of dipping mandrel 10 can define top outer surface 34, top inner surface 37, side outer surface 40, side inner surface 43, bottom outer surface 46, and bottom inner surface 49. As depicted in FIGS. 1–4, the inner and outer surfaces can define a shell (e.g., a funnel-shaped shell), such that the inner surfaces define an inner space. Top outer surface 34 also can define top outer perimeter 52 and top inner perimeter 55; top inner perimeter 55 can be proximal to upper adapter 22. Top outer surface 34 can define a downward slope, such that top outer perimeter 52 is positioned vertically higher than top inner perimeter 55. This downward slope can be curved or straight, for example.

Top outer surface 34 also can define opening 58, which can be positioned in top inner perimeter 55 adjacent to upper adapter 22. Opening 58 can be within about three centimeters from upper adapter 22 (e.g., 0.5 centimeter, one centimeter, 1.5 centimeters, two centimeters, 2.5 centimeters, or three centimeters from upper adapter 22). Top inner perimeter 55 can define a slope such that opening 58 is positioned at the lowest point of top inner perimeter 55 when drip retainer 19 and dipping mandrel 10 are in an upright position as depicted in FIGS. 1 and 2. Opening 58 can define any shape (e.g., a circle, a square, a slit, or a slot), and can have any suitable width or diameter (e.g., less than $1/16$ inch, $1/16$ inch, $1/8$ inch, $3/16$ inch, $1/4$ inch, $5/16$ inch, $3/8$ inch, $7/16$ inch, $1/2$ inch, $5/8$ inch, $9/16$ inch, $3/4$ inch, or more than $3/4$ inch).

Top outer surface 34 and opening 58 also can define lip 61, which serves as an inlet structure protruding into the interior of drip retainer 19. Lip 61 can facilitate the entry of fluid (e.g., fluid flowing down the slope of top outer surface 34 toward top inner perimeter 55) into drip retainer 19. Lip 61 also can be configured to facilitate retention of fluid within drip retainer 19 when dipping mandrel 10 is inverted (see, e.g., FIG. 4).

Bottom outer surface 46 can define bottom outer perimeter 64 and bottom inner perimeter 67. Bottom outer perimeter can be positioned distal to lower adapter 25 and bottom inner perimeter 67 can be positioned proximal to lower adapter 25. Bottom outer surface 46 and bottom inner surface 49 can be sloped (e.g., steeply sloped or moderately sloped) such that bottom outer perimeter 64 is positioned vertically higher than bottom inner perimeter 67 when dipping mandrel 10 is in an upright position (e.g., as shown in FIGS. 1 and 2). As depicted in FIGS. 1–4, the slope of bottom outer surface 46 and bottom inner surface 49 can define a curve. The angle of the slope can be 5, 10, 20, 30, 35, 40, 45, 50, or 60 degrees, for example, and can be determined between (1) a line from a point where lower adapter 25 meets bottom inner perimeter 67 (e.g., point 68 shown in FIG. 2) to the most distal edge of outer bottom surface 46 (e.g., point 69 shown in FIG. 2), and (2) the horizontal plane containing the point where lower adapter 25 meets bottom inner perimeter 67 when dipping mandrel 10 is in an upright position. With reference to FIG. 2, for example, the angle can be determined between line a (defined by points 68 and 69) and line b (the horizontal plane through point 68 when dipping mandrel 10 is upright). The slope of bottom inner surface 49 can facilitate the movement of a fluid contained within drip retainer 19, such that the fluid moves away from shaft 12 and toward side inner surface 43 when dipping mandrel 10 is tilted (e.g., tilted by 90 degrees relative to an upright position, or inverted, as shown in FIGS. 3 and 4, respectively).

With reference to FIGS. 2, 3, and 4, drip retainer 19 can be configured to retain fluid 70 when attached to shaft 12, whether dipping mandrel 10 is in an upright position (FIG. 2) or is in a tilted position relative to an upright position (e.g., a sideways position as in FIG. 3, or an inverted position as in FIG. 4). When dipping mandrel 10 is in an inverted position as shown in FIG. 4, lip 61 can facilitate retention of fluid 70 such that little, if any, escapes through opening 58 and drips onto the mold or flows along shaft 12. Lip 61 also can facilitate retention of fluid such that little, if any, escapes through opening 58 when dipping mandrel 10 is tilted less than 180 degrees (e.g., 45, 90, or 120 degrees) from an upright position.

Figure 5:
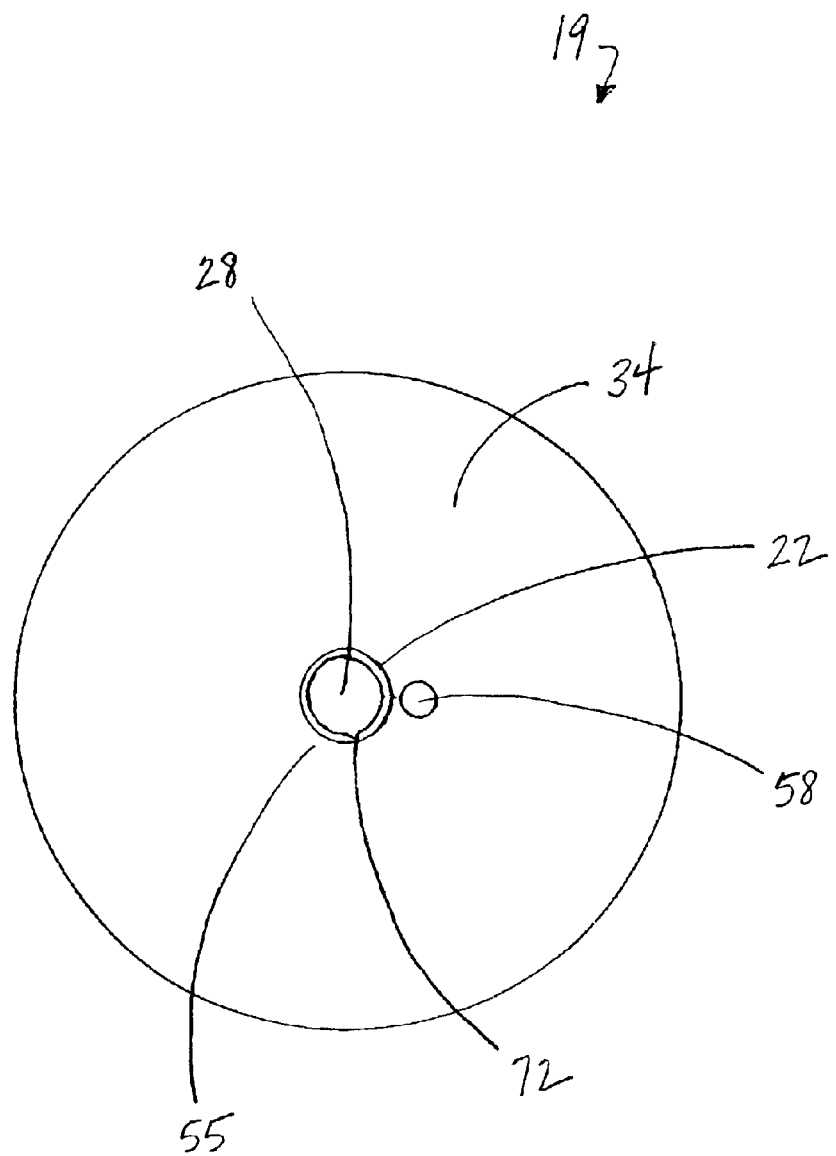
FIG. 5 is an overhead view of the drip retainer of FIG. 1, having a single opening.

FIGS. 5, 6, 7, 8, and 9 are overhead views of drip retainer 19. As depicted in FIG. 5, top outer surface 34 can define opening 58, which is circular in shape and is positioned in top inner perimeter 55. When top outer surface 34 defines a single opening such as opening 58, top inner perimeter 55 can be sloped such that opening 58 is positioned at the lowest region of top inner perimeter 55. In addition, adapter 22 can define vent 72, which can be a groove machined in the inner surface of adapter 22. Vent 72 can allow air to escape from drip retainer 19 when fluid 70 enters through opening 58.

Figure 6:
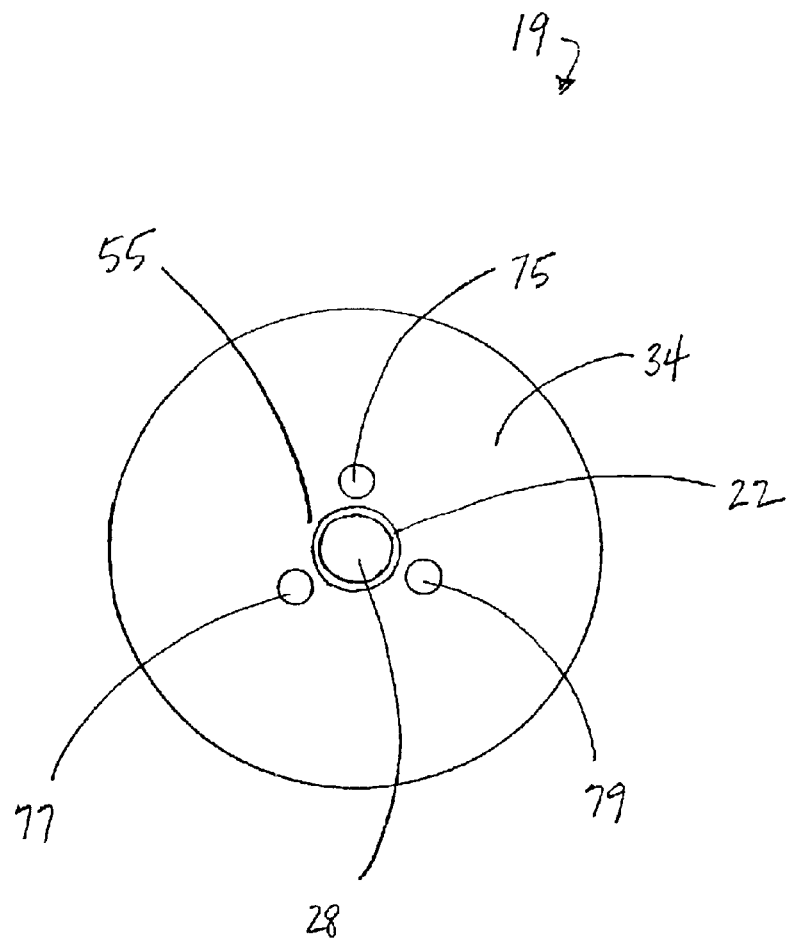
FIG. 6 is an overhead view of the drip retainer of FIG. 1, having three openings.

In another embodiment shown in FIG. 6, top outer surface 34 can define openings 75, 77, and 79, which are circular and are positioned in top inner perimeter 55. When top outer surface 34 defines multiple openings such as openings 75, 77, and 79, top inner perimeter 55 can be flat or can define multiple sloped regions such that fluid is directed toward the openings. Openings 75, 77, and 79 each can define a lip that protrudes into the interior of drip retainer 19. These lips can be configured to facilitate fluid entry into drip retainer 19 and to facilitate retention of fluid within drip retainer 19 when dipping mandrel 10 is tilted from an upright position (e.g., tilted 5 to 180 degrees from an upright position).

Figure 7:
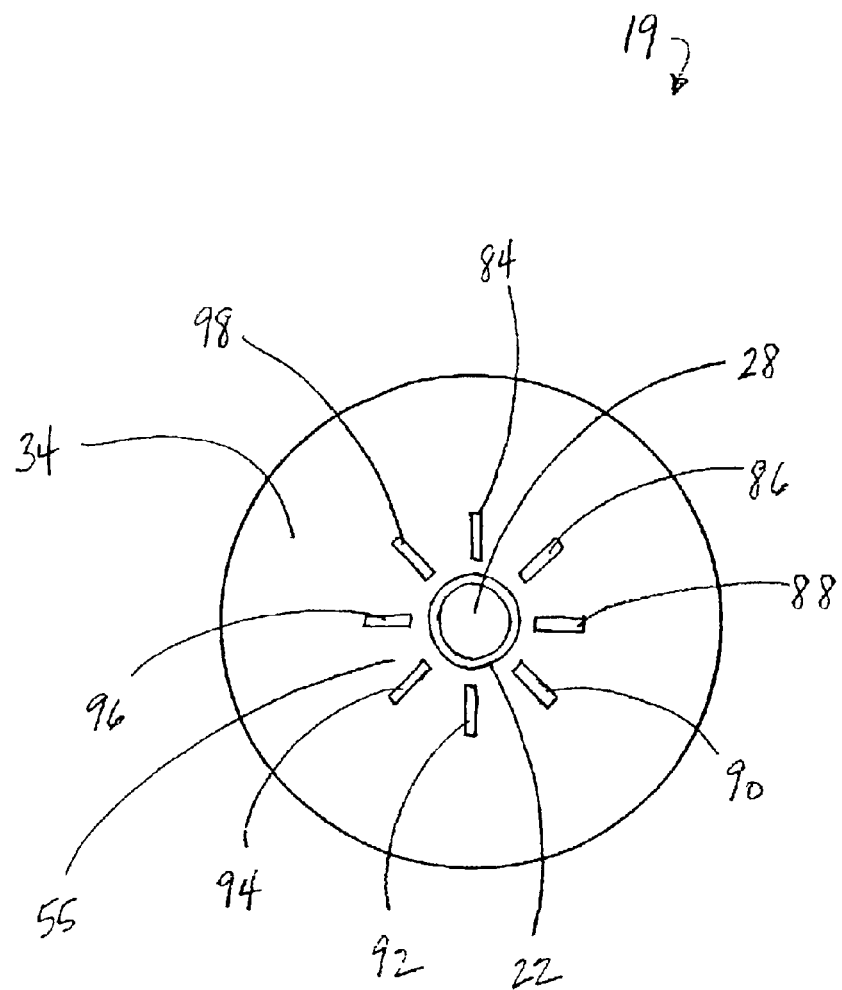
FIG. 7 is an overhead view of the drip retainer of FIG. 1, having eight slit openings.

FIG. 7 depicts another embodiment of drip retainer 19, in which top outer surface 34 can define slots 84, 86, 88, 90, 92, 94, 96, and 98. Slots 84, 86, 88, 90, 92, 94, 96, and 98 can extend radially outward from top inner perimeter 55, which can be flat or can define multiple sloped regions to direct fluid into the slots. Slots 84, 86, 88, 90, 92, 94, 96, and 98 each can define a lip that protrudes into the interior of drip retainer 19. Each lip can be configured to facilitate fluid entry into drip retainer 19 and to facilitate retention of fluid within drip retainer 19 when dipping mandrel 10 is tilted from an upright position.

Figure 8:
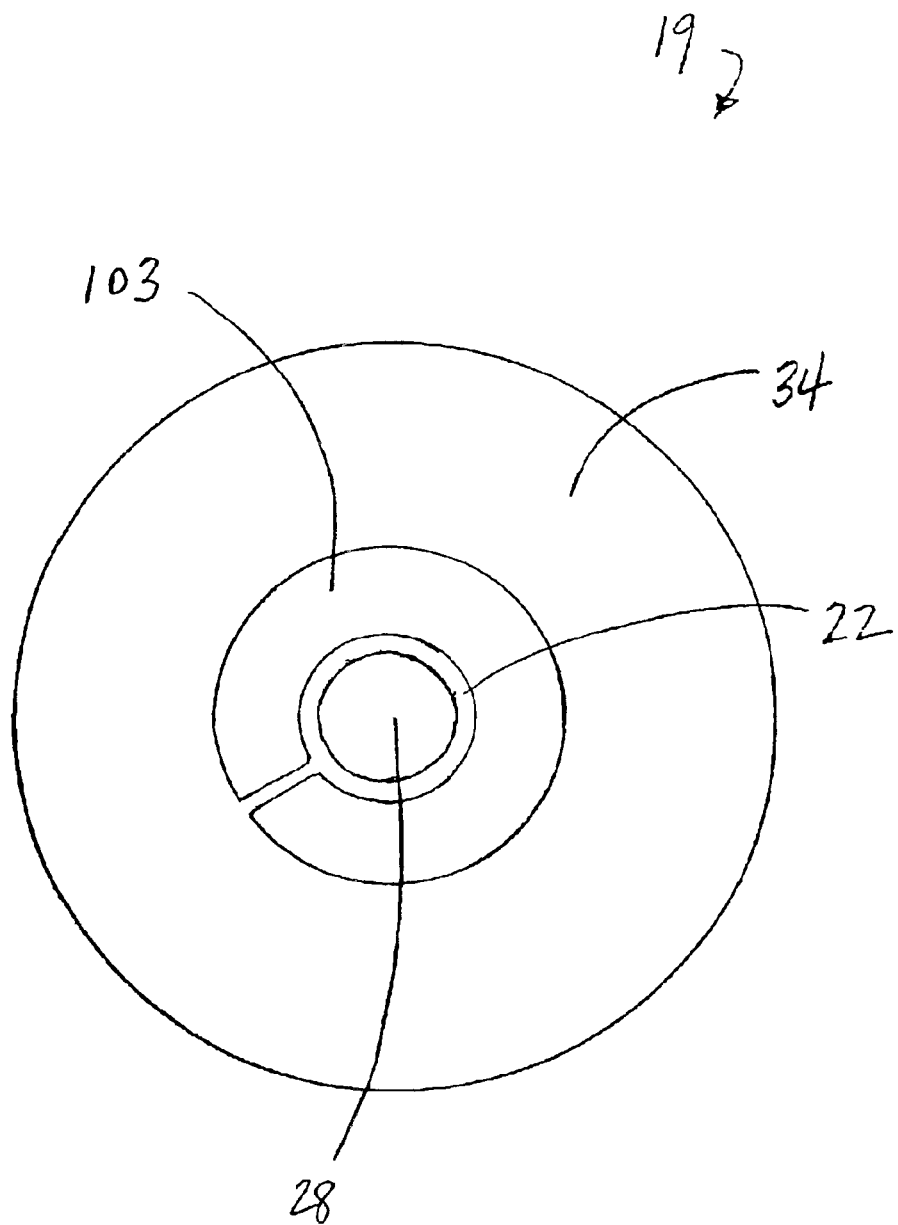
FIG. 8 is an overhead view of the drip retainer of FIG. 1, having a single opening that completely surrounds the upper adapter.

In yet another embodiment, depicted in FIG. 8, top outer surface 34 can define opening 103, which substantially surrounds upper adapter 22. Opening 103 can have any suitable width. Typically, the width will be configured such that fluid is retained within drip retainer 19 when dipping mandrel 10 is tilted 90 degrees or inverted. Opening 103 also can define a lip that protrudes into the interior of drip retainer 19 and is configured to facilitate fluid entry into drip retainer 19 and to facilitate retention of fluid within drip retainer 19 when dipping mandrel 10 is tilted from an upright position.

Figure 9:
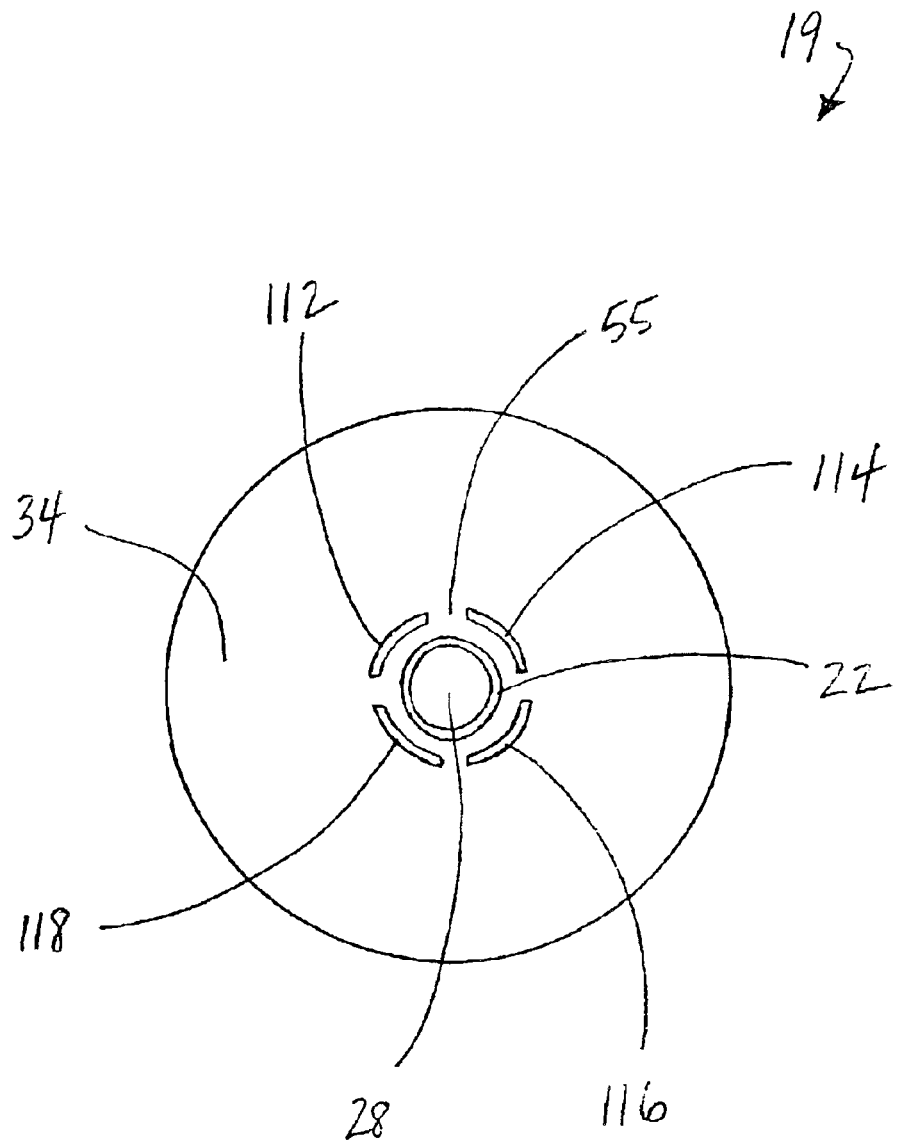
FIG. 9 is an overhead view of the drip retainer of FIG. 1, having four slit openings.

FIG. 9 depicts another embodiment of drip retainer 19, in which top outer surface 34 can define slots 112, 114, 116, and 118. Slots 112, 114, 116, and 118 can be positioned to partially encircle upper adapter 22 and can be positioned in top inner perimeter 55. Each slot can define a lip that protrudes into the interior of drip retainer 19, and each lip can be configured to facilitate fluid entry into drip retainer 19 and to facilitate retention of fluid within drip retainer 19 when dipping mandrel 10 is tilted from an upright position.

Figure 10:
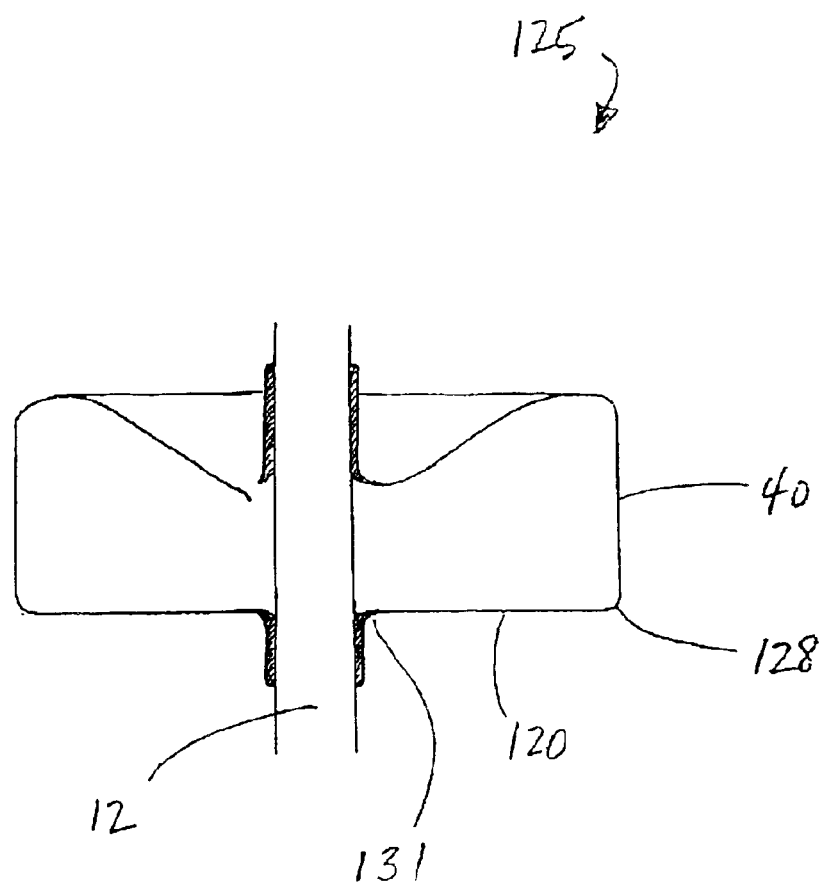
FIG. 10 is a cross-sectional view of a drip retainer, having a flat bottom surface.

With reference to FIG. 10, bottom outer surface 120 of drip retainer 125 can define bottom distal edge 128 and bottom central region 131 such that bottom outer surface 125 is flat (i.e., bottom distal edge 128 is not positioned higher or lower than bottom central region 131 when dipping mandrel 10 containing drip retainer 125 is in an upright or an inverted position). As depicted in FIG. 10, bottom outer surface 120 and side outer surface 40 can be essentially perpendicular to one another.

Figure 11:
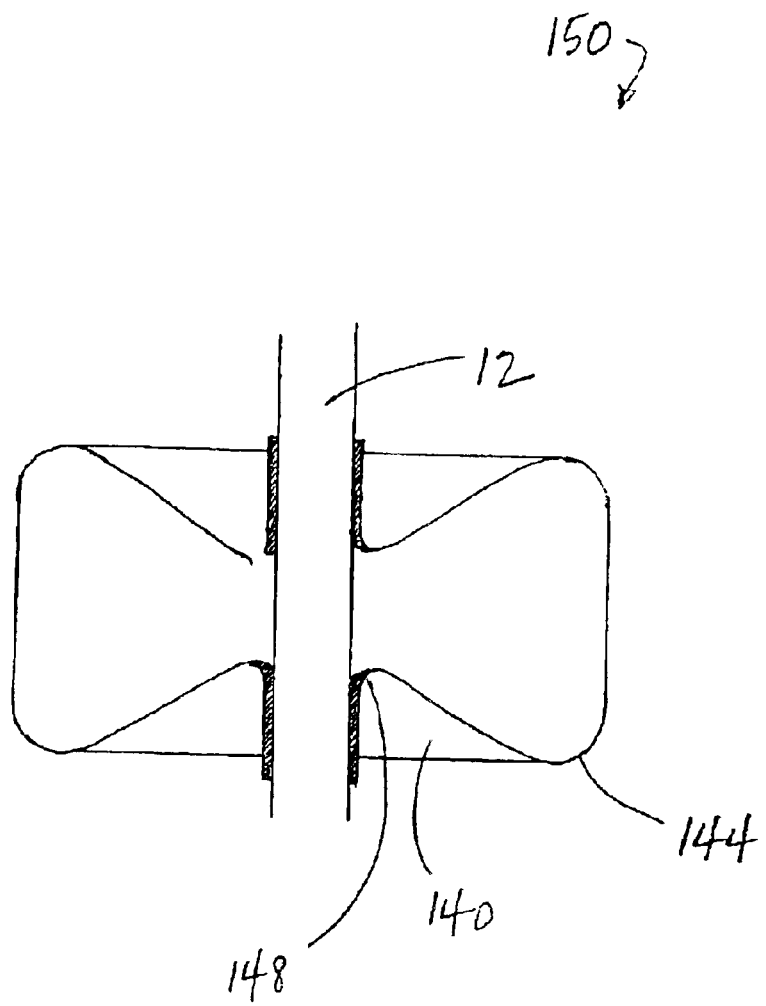
FIG. 11 is a cross-sectional view of a drip retainer having an upwardly sloped bottom surface.

With reference to FIG. 11, bottom outer surface 140 can define bottom distal edge 144 and bottom central region 148, such that bottom central region 148 is positioned vertically higher than bottom distal edge 144 when dipping mandrel 10 containing drip retainer 150 is in an upright position. In such an embodiment, bottom outer surface 140 can be flat or curved.

Figure 12:
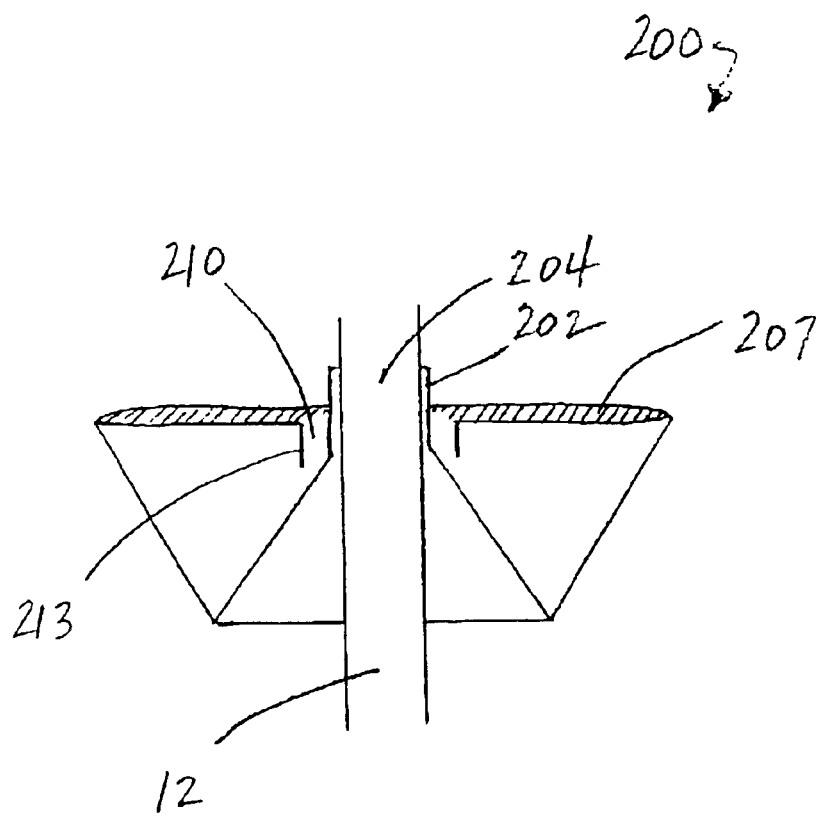
FIG. 12 is a cross-sectional view of a drip retainer.

With reference to FIG. 12, drip retainer 200 can have adapter 202, which defines aperture 204 for insertion of shaft 12. Adapter 202 can be configured to fit around shaft 12, such that drip retainer 200 does not slide unassisted (i.e., without force being exerted up on it) up or down shaft 12. Drip retainer 200 can have top outer surface 207, which can define opening 210. Opening 210 can define lip 213 that protrudes into the interior of drip retainer 200. Lip 213 can be configured to facilitate retention of fluid within drip retainer 200 when drip retainer 200 is attached to shaft 12 and dipping mandrel 10 is held in a tilted position (e.g., 5 to 180 degrees from an upright position).

Figure 13:
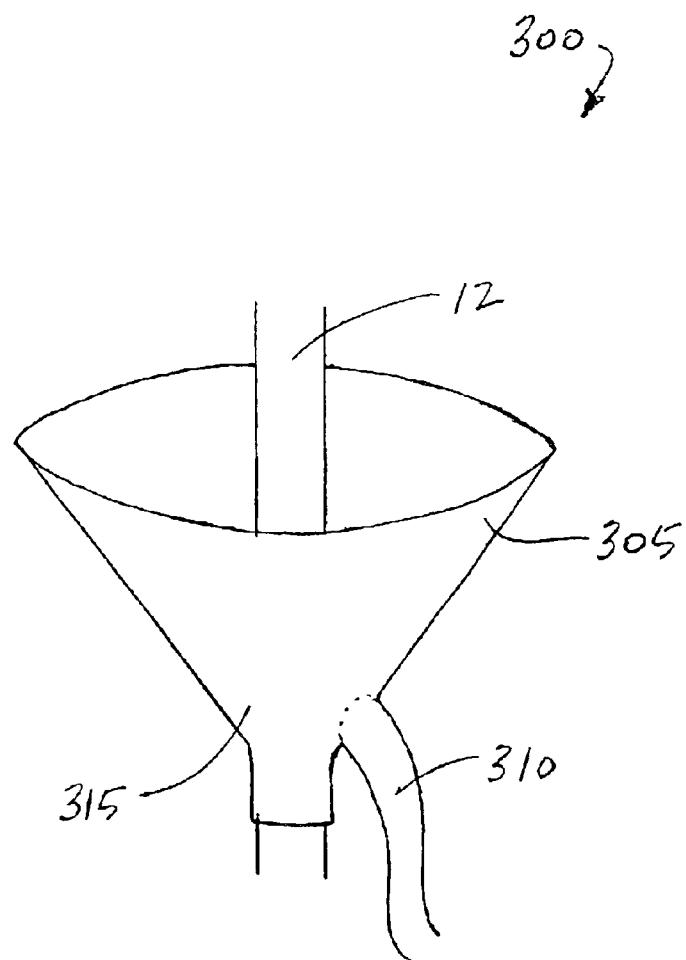
FIG. 13 is a side view of a drip retainer having a funnel and an exit tube.
Figure 14:
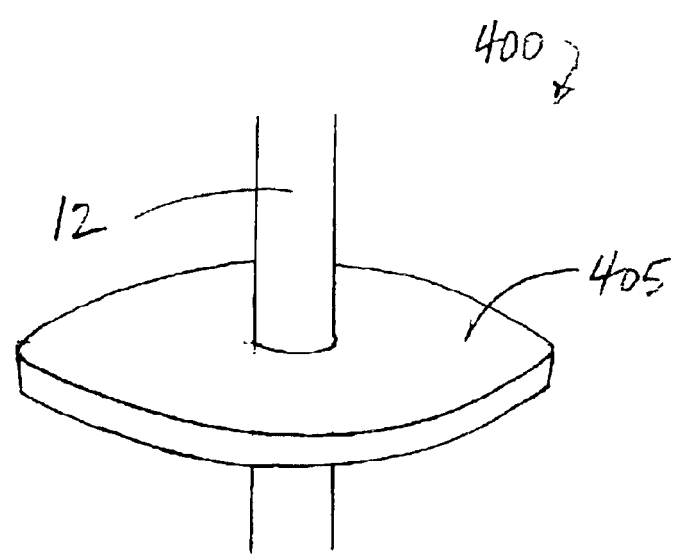
FIG. 14 is a side view of a drip retainer.

With reference to FIG. 13, drip retainer 300 can define funnel 305 connected to exit tubing 310. Funnel 305 can define lower surface 315, which can define an opening and an adapter for attachment to drain tubing 310. When drip retainer 300 is attached to a shaft at a position below a mold, fluid can move away from the mold and into funnel 305. Such fluid then can exit funnel 305 through the opening into drain tubing 310. A pump or vacuum can be attached to drain tubing 310 to draw the fluid out of funnel 305.

Figure 15:
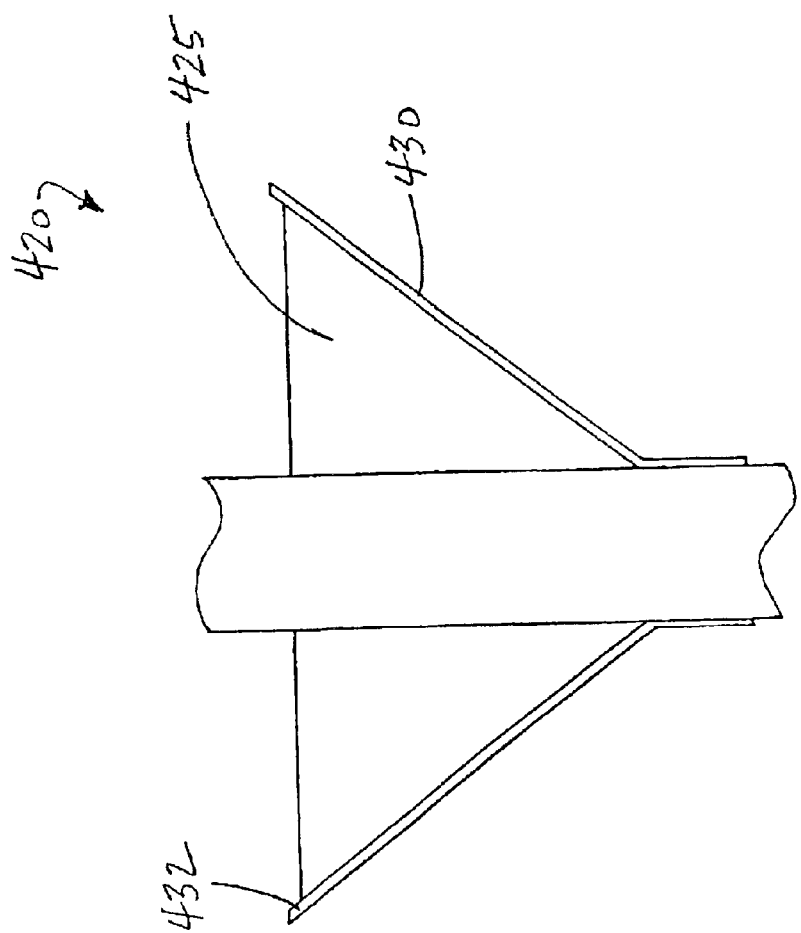
FIG. 15 is a cross-sectional view of a drip retainer.
Figure 16:
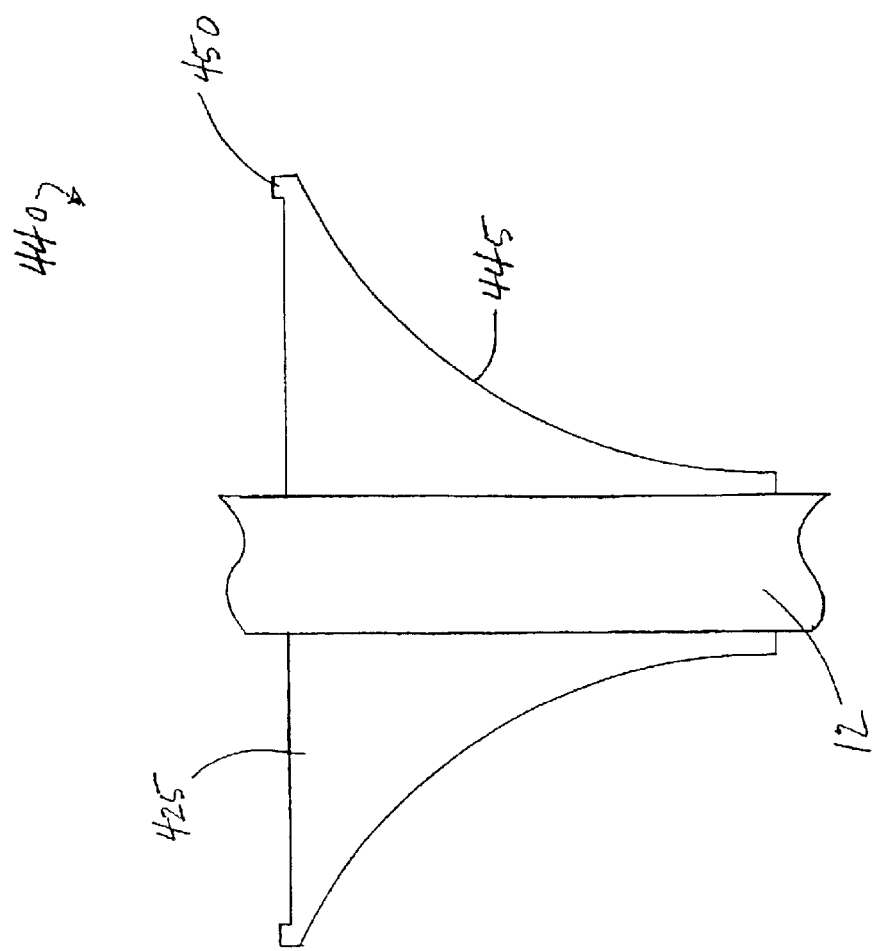
FIG. 16 is a cross-sectional view of a drip retainer.
Figure 17:
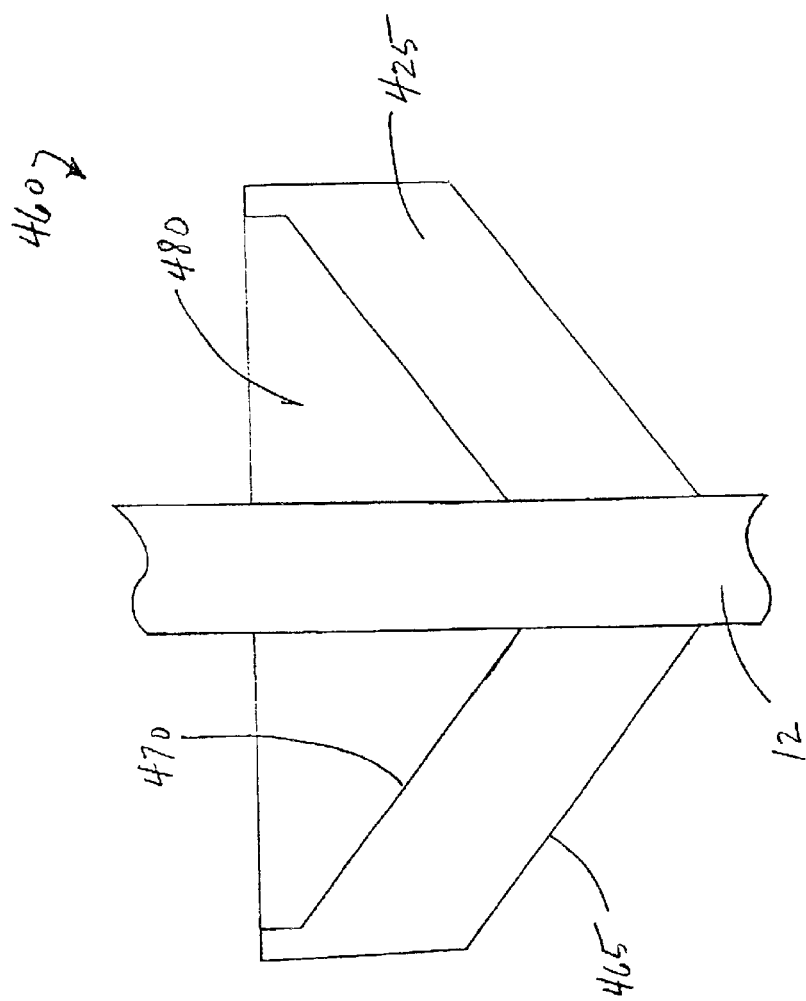
FIG. 17 is a cross-sectional view of a drip retainer.

With reference to FIGS. 14–17, a drip retainer can be made from an absorbent or adsorbent material (e.g., elastomeric foam or absorbent or adsorbent material molded with a binder resin). Examples of adsorbent fluid retainer materials include open cell plastic foam, sintered plastic or metal, glass wool, ceramic noodle and synthetic non-woven fibers. Examples of suitable absorbent fluid retainer materials include cotton winding, sodium polyacrylate, and cellulose materials. Adsorbent/absorbent fluid retainers can be configured with materials such as cellulose products, diatomaceous clay, wood sawdust, or ground peanut shells molded into a fluid retainer element using a binder matrix. The absorbent or adsorbent material can trap and retain fluid that drips or flows away from mold 11 when dipping mandrel 10 is in an upright position or is tilted from an upright position (e.g., 5 to 180 degrees from an upright position). Such material can have any suitable configuration. Drip retainer 400 (FIG. 14), for example, can be a disk made from an absorbent or adsorbent material. Drip retainer 420 (FIG. 15) can be constructed from absorbent/adsorbent material 425 placed in outer shell 430 made from a non-absorbent material (e.g., molded plastic or formed metal). Upper edge 432 of outer shell 430 can extend above absorbent/adsorbent material 425, and can function to prevent run-off of any fluid before it is absorbed. Drip retainer 420 can have any suitable shape (e.g., a solid funnel or cone shape as depicted in FIG. 15, or a cylindrical or cubic shape). Alternatively, drip retainer 440 (FIG. 16) can consist of absorbent/adsorbent material 425 molded into any suitable shape. Drip retainer 440 can have, for example, a funnel-like shape with curved lower surface 445, as depicted in FIG. 16, or drip retainer 440 can have any other suitable shape. Furthermore, absorbent/adsorbent material 425 can be molded such that upper lip 450 prevents fluid run-off from drip retainer 440 before absorbance occurs. In another embodiment, drip retainer 460 (FIG. 17) can consist of absorbent/adsorbent material 425 that is molded to define outer surface 465 and inner surface 470. Outer surface 465 can define a funnel shape as shown in FIG. 17, for example, while inner surface 470 can define cavity 480. Cavity 480 can function as a collection site for fluid before it is absorbed into drip retainer 460.

Figure 18:
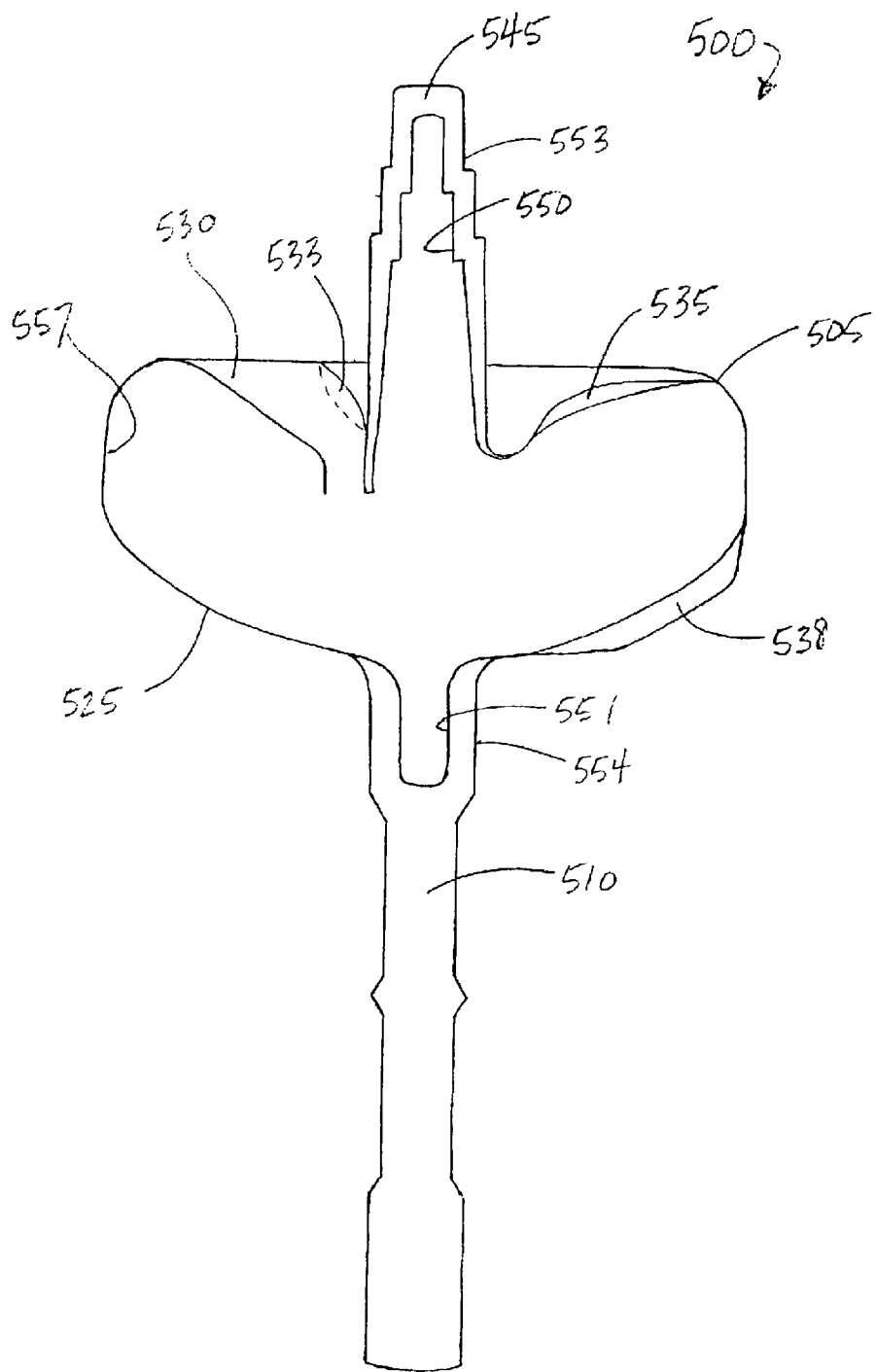
FIG. 18 is a cross-sectional view of a drip retainer/shaft unit.
Figure 19:
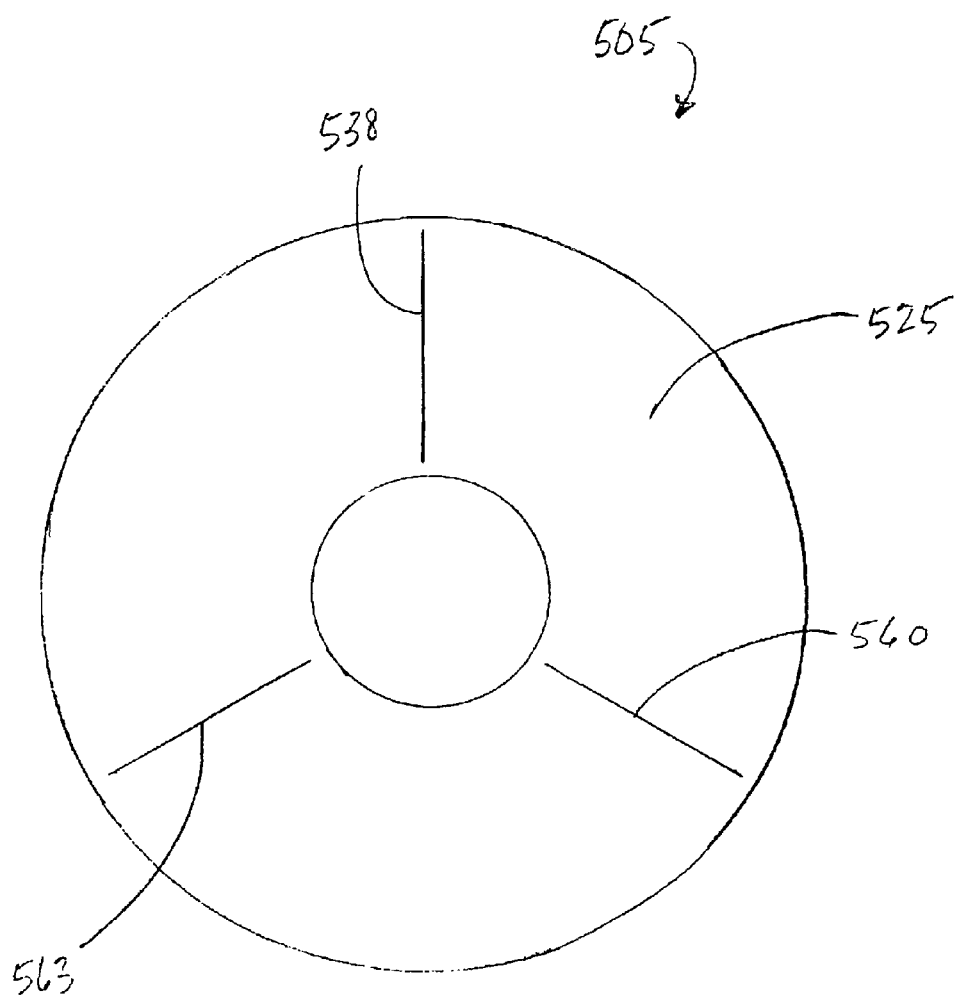
FIG. 19 is a bottom view of the drip retainer/shaft unit of FIG. 18.
Figure 20:
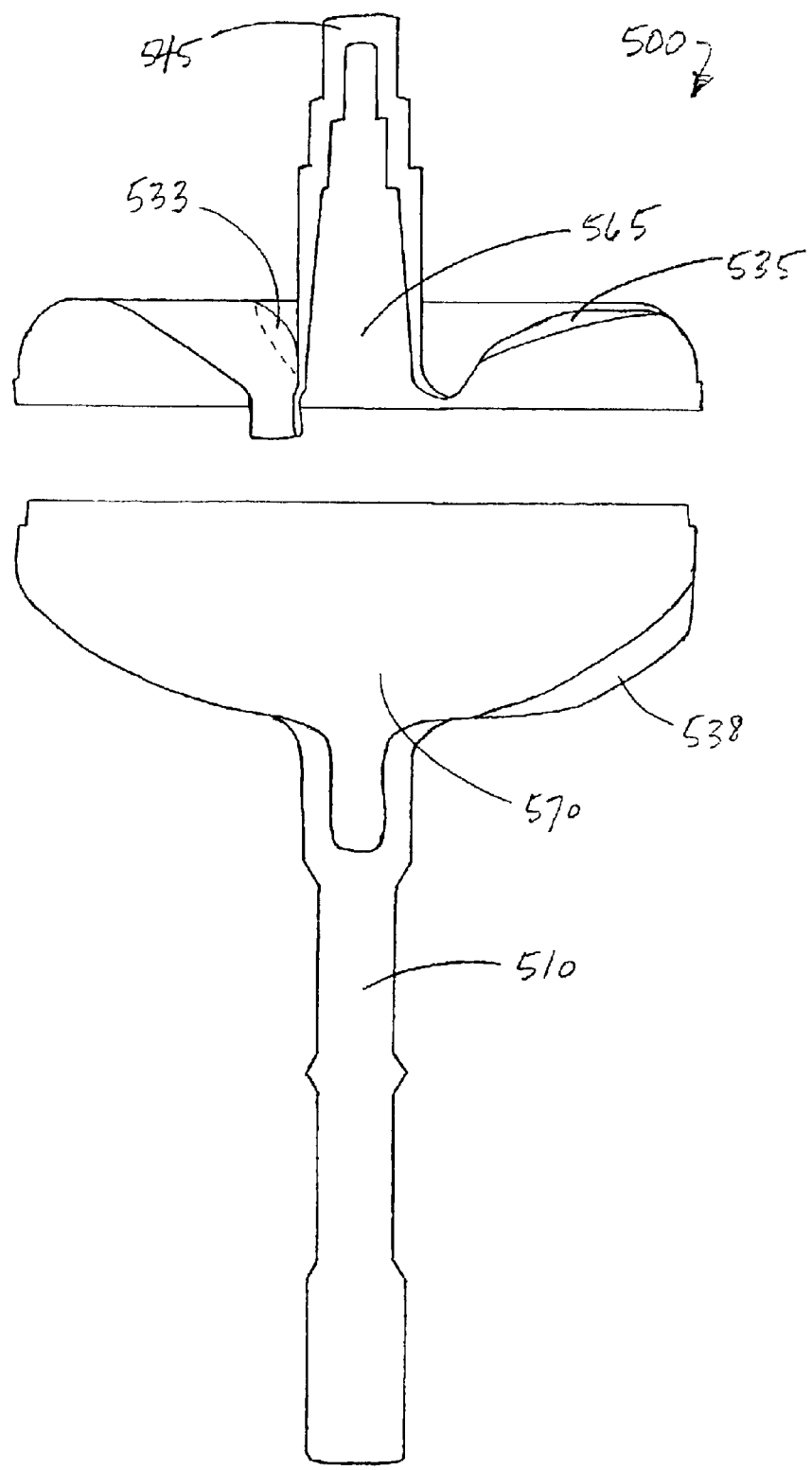
FIG. 20 is a cross-sectional view of the upper and lower portions of the drip retainer/shaft unit of FIG. 18.

With reference to FIGS. 18–20, drip retainer/shaft unit 500 can be configured to incorporate both drip retainer 505 and shaft 510. Drip retainer/shaft unit 500 can be constructed from any suitable material, such as a thermoplastic material (e.g., a polyolefin such as polypropylene, polyethylene, or polymethylpentene), vinyl, or metal (e.g., aluminum, copper, or steel), for example. Drip retainer/shaft unit 500 can be reusable or disposable.

As shown in FIG. 18, drip retainer 505 can have bottom surface 525 and top surface 530, which can define one or more ribs (e.g., ribs 533, 535, and 538). Ribs 533, 535, and 538 can be used to assist with rotating drip retainer/shaft unit 500 during procedures such as spin welding, dipping, or attachment or removal (e.g., screwing or unscrewing) of shaft 510 into a mold. Drip retainer 505 can define any number of ribs (e.g., one, two, three, four, five, six, seven, eight, nine, ten, or more than ten ribs).

Shaft 510 can be configured to have any suitable shape (e.g., straight or bent, with curved or sharp angles). As shown in FIG. 18, shaft 510 can define upper end 545, which can be configured to attach to a mold. All or part of shaft 510 can have interior surface 550 and/or 551 in addition to exterior surfaces 553 and 554, such that interior surface 550 is contiguous with interior surface 557 of drip retainer 505.

FIG. 19 depicts bottom surface 525 of drip retainer 505, and shows the positions of ribs 538, 560, and 563.

As shown in FIG. 20, drip retainer/shaft unit 500 can be constructed from upper section 565 and lower section 570. Upper section 565 and lower section 570 can be constructed using any method, including, without limitation, blow molding and injection molding. Upper section 565 can be attached to lower section 570 in any manner (e.g., by a slip fit, a screw fit, spin welding, solvent bonding, ultrasonic welding, or with metal paste that can be heated to form a bond).

The invention also provides a method for making an elastomeric structure (e.g., a shell for a mammary prosthesis). Typically, the method involves providing a dipping device such as those described herein. The mold can be contacted with a fluid containing an elastomeric compound such that the fluid coats at least a portion of the mold. At least a portion of the excess fluid can be collected within the drip retainer. The dipping device then can be rotated or tilted (e.g., inverted) with substantially all of the collected fluid remaining within the drip retainer. Once complete, the elastomeric coat can be removed from the mold, thereby forming an elastomeric structure. All or part of these methods can be automated, and can be performed such that substantially all of the mold is contacted by the fluid.

OTHER EMBODIMENTS

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. A dipping device comprising:
   (a) a shaft having a first end and a second end;
   (b) a mold comprising a top surface and a bottom surface, wherein said bottom surface defines an attachment point, wherein said mold is attached to said first end at said attachment point, and wherein said top surface defines a top reference point opposite said attachment point; and
   (c) a drip retainer, wherein said drip retainer is attached to said shaft between said first end and said second end, wherein said drip retainer collects fluid that moves in a direction away from said mold and toward said drip retainer when said dipping device is in an upright position such that said top reference point is centered above said attachment point, and wherein said drip retainer prevents substantially all of said collected fluid from contacting said mold when said dipping device is inverted from said upright position.

2. The dipping device of claim 1, wherein said shaft extends in a single direction from said first end to said second end.

3. The dipping device of claim 1, wherein said shaft comprises steel, aluminum, plastic, metal, or wood.

4. The dipping device of claim 1, wherein said mold is a mammary prosthesis mold.

5. The dipping device of claim 4, wherein said mammary prosthesis mold is selected from the group consisting of high profile mammary prosthesis molds, medium profile mammary prosthesis molds, and low profile mammary prosthesis molds.

6. The dipping device of claim 4, wherein said mammary prosthesis is a 900 cc mammary prosthesis.

7. The dipping device of claim 4, wherein said mammary prosthesis is a 225 to 300 cc mammary prosthesis.

8. The dipping device of claim 1, wherein said mold is reversibly attached to said first end.

9. The dipping device of claim 1, wherein said mold is attached to said first end by a threaded joint, a slip fit, a twist lock, a deformable elastomeric grip, or a magnetic lock.

10. The dipping device of claim 1, wherein said mold comprises steel, aluminum, porcelain, plastic, an elastomer, wax, glass, or a cellulose-based material.

11. The dipping device of claim 1, wherein said drip retainer comprises a shell defining an inner space.

12. The dipping device of claim 11, wherein said shell comprises an upper adapter defining an upper aperture, wherein said upper aperture is configured to receive said shaft.

13. The dipping device of claim 12, wherein said upper adapter forms a fluid tight seal with said shaft.

14. The dipping device of claim 12, wherein said shell comprises a lower adapter defining a lower aperture, wherein said lower aperture is configured to receive said shaft.

15. The dipping device of claim 14, wherein said lower adapter forms a fluid tight seal with said shaft.

16. The dipping device of claim 14, wherein said lower adapter forms a taper lock with said shaft.

17. The dipping device of claim 14, wherein said lower adapter forms a friction fit with said shaft when said shaft enters said lower aperture in a direction toward said upper aperture.

18. The dipping device of claim 14, wherein said lower adapter positioned on said shaft by an o-ring.

19. The dipping device of claim 14, wherein said upper and lower apertures are aligned such that said shaft extends through said drip retainer.

20. The dipping device of claim 19, wherein said upper and lower apertures are aligned vertically.

21. The dipping device of claim 11, wherein said shell comprises a top surface defining an outer perimeter and an inner perimeter, wherein said top surface slopes downward from said outer perimeter toward said inner perimeter.

22. The dipping device of claim 21, wherein said top surface comprises at least one opening.

23. The dipping device of claim 22, wherein said at least one opening is adjacent to an upper adapter.

24. The dipping device of claim 23, wherein said at least one opening is within 3 centimeters of said upper adapter.

25. The dipping device of claim 22, wherein said at least one opening is positioned at a point along said inner perimeter.

26. The dipping device of claim 22, wherein said inner perimeter slopes toward at least one point along said inner perimeter, and wherein said at least one opening is positioned at said at least one point.

27. The dipping device of claim 22, wherein said drip retainer comprises an inlet structure that protrudes from the underside of said top surface into said inner space.

28. The dipping device of claim 11, wherein said shell comprises a bottom surface defining an outer perimeter and an inner perimeter, wherein said bottom surface slopes downward from said outer perimeter toward said inner perimeter.

29. The dipping device of claim 1, wherein said drip retainer is positioned on said shaft between about 1 centimeter and about 10 centimeters from said mold.

30. The dipping device of claim 1, wherein said drip retainer is detachable from said shaft.

31. The dipping device of claim 1, wherein said drip retainer comprises an absorbent or adsorbent material, a thermoplastic material, or metal.

32. The dipping device of claim 31, wherein said thermoplastic material is a polyolefin.

33. The dipping device of claim 32, wherein said polyolefin is polyethylene, polypropylene, or polymethylpentene.

34. The dipping device of claim 31, wherein said metal is aluminum, copper, or steel.

35. The dipping device of claim 1, wherein said fluid comprises an elastomeric compound dispersed in a solvent.

36. The dipping device of claim 35, wherein said elastomeric compound is silicone or polyurethane.

37. A dipping device comprising:
(a) a shaft having a first end and a second end;
(b) a mold comprising a top surface and a bottom surface, wherein said bottom surface defines an attachment point, wherein said mold is attached to said first end at said attachment point, and wherein said top surface defines a top reference point opposite said attachment point; and
(c) a drip retainer, wherein said drip retainer is attached to said shaft between said first end and said second end, wherein said drip retainer collects fluid that moves in a direction away from said mold and toward said drip retainer when said dipping device is in an upright position such that said top reference point is centered above said attachment point, and wherein said drip retainer prevents substantially all of said collected fluid from contacting said mold when said dipping device is rotated 90 degrees from said upright position.

38. A drip retainer comprising a shell defining an inner space, wherein said shell comprises:
(a) an upper adapter defining an upper aperture, wherein said upper aperture is configured to receive a shaft;
(b) a lower adapter defining a lower aperture, wherein said lower aperture is configured to receive said shaft; and
(c) a top surface defining an outer perimeter, an inner perimeter, and at least one opening, wherein said top surface slopes downward from said outer perimeter toward said inner perimeter, and wherein said at least one opening is positioned at a point along said inner perimeter.

39. The drip retainer of claim 38, wherein the maximum distance across said upper aperture is between about 2 millimeters and about 5 centimeters.

40. The drip retainer of claim 38, wherein the maximum distance across said lower aperture is between about 2 millimeters and about 5 centimeters.

41. The drip retainer of claim 38, wherein said upper adapter forms a fluid tight seal with said shaft.

42. The drip retainer of claim 38, wherein said lower adapter forms a fluid tight seal with said shaft.

43. The drip retainer of claim 38, wherein said lower adapter forms a friction fit with said shaft when said shaft enters said lower aperture in a direction toward said upper aperture.

44. The drip retainer of claim 38, wherein said lower adapter is positioned on said shaft by an o-ring.

45. The drip retainer of claim 38, wherein said upper and lower apertures are aligned such that said shaft extends through said drip retainer.

46. The drip retainer of claim 45, wherein said upper and lower apertures are aligned vertically.

47. The drip retainer of claim 38, wherein said at least one opening is adjacent to said upper adapter.

48. The drip retainer of claim 47, wherein said at least one opening is within about 3 centimeters of said upper adapter.

49. The drip retainer of claim 38, wherein said inner perimeter slopes toward at least one point along said inner perimeter, and wherein said at least one opening is positioned at said at least one point.

50. The drip retainer of claim 38, wherein said shell comprises an inlet structure that protrudes from the underside of said top surface into said inner space.

51. The drip retainer of claim 38, wherein said shell comprises a bottom surface defining a second outer perimeter and a second inner perimeter, wherein said bottom surface slopes downward from said second outer perimeter toward said second inner perimeter.

52. The drip retainer of claim 38, wherein said drip retainer comprises a thermoplastic material or metal.

53. The drip retainer of claim 52, wherein said thermoplastic material is a polyolefin.

54. The drip retainer of claim 53, wherein said polyolefin is polypropylene, polyethylene, or polymethylpentene.

55. The drip retainer of claim 52, wherein said metal is aluminum, copper, or steel.

56. The drip retainer of claim 38, wherein said drip retainer collects fluid that moves in a direction away from a mold and toward said drip retainer when (a) said drip retainer is attached to said shaft that is attached to a mold thereby forming a dipping device and (b) said dipping device is in an upright position, and wherein said drip retainer prevents substantially all of said collected fluid from contacting said mold when said dipping device is inverted from said upright position.

57. A hollow funnel defining an inner space, wherein said hollow funnel comprises:
(a) an upper adapter defining an upper aperture, wherein said upper aperture is configured to receive a shaft,
(b) a lower adapter defining a lower aperture, wherein said lower aperture is configured to receive said shaft, and (c) a top surface defining an outer perimeter, an inner perimeter, and at least one opening, wherein said top surface slopes downward from said outer perimeter toward said inner perimeter, and wherein said at least one opening is positioned at a point along said inner perimeter, wherein substantially all the fluid that enters said inner space through said at least one opening when said hollow funnel is in an upright position with said shaft positioned through said upper and lower apertures remains within said inner space when said hollow funnel is inverted from said upright position.

58. A method for making an elastomeric structure, said method comprising:
   (a) providing a dipping device, wherein said dipping device comprises:
      (i) a shaft having a first end and a second end,
      (ii) a mold for said elastomeric structure, wherein said mold comprises a bottom surface, wherein said bottom surface defines an attachment point, wherein said mold is attached to said first end at said attachment point, and
      (iii) a drip retainer, wherein said drip retainer is attached to said shaft between said first end and said second end;
   (b) contacting said mold with a fluid comprising an elastomeric compound such that said fluid coats at least a portion of said mold and such that at least a portion of the excess fluid collects within said drip retainer;
   (c) inverting said dipping device, wherein substantially all of said collected fluid remains within said drip retainer; and
   (d) removing the elastomeric coat from said mold, thereby forming said elastomeric structure.

59. The method of claim 58, wherein said elastomeric structure is a mammary prosthesis.

60. The method of claim 58, wherein steps (b) and (c) are automated.

61. The method of claim 58, wherein step (b) is performed such that substantially all of said mold is coated by said fluid.

* * * * *

UNITED STATES PATENT AND TRADEMARK OFFICE
CERTIFICATE OF CORRECTION

PATENT NO. : 6,780,366 B2
DATED : August 24, 2004
INVENTOR(S) : Koua Vang, Phillip E. Duckert and Terence M. Fogarty It is certified that error appears in the above-identified patent and that said Letters Patent is hereby corrected as shown below:

Column 12,
Line 64, after "adapter" please insert -- is --.

Signed and Sealed this

Twenty-fourth Day of May, 2005

JON W. DUDAS
*Director of the United States Patent and Trademark Office*